No. 782,457. PATENTED FEB. 14, 1905.
W. A. MICHAEL.
AUTOMATIC GAS CUT-OFF.
APPLICATION FILED MAY 27, 1904.
2 SHEETS—SHEET 1.
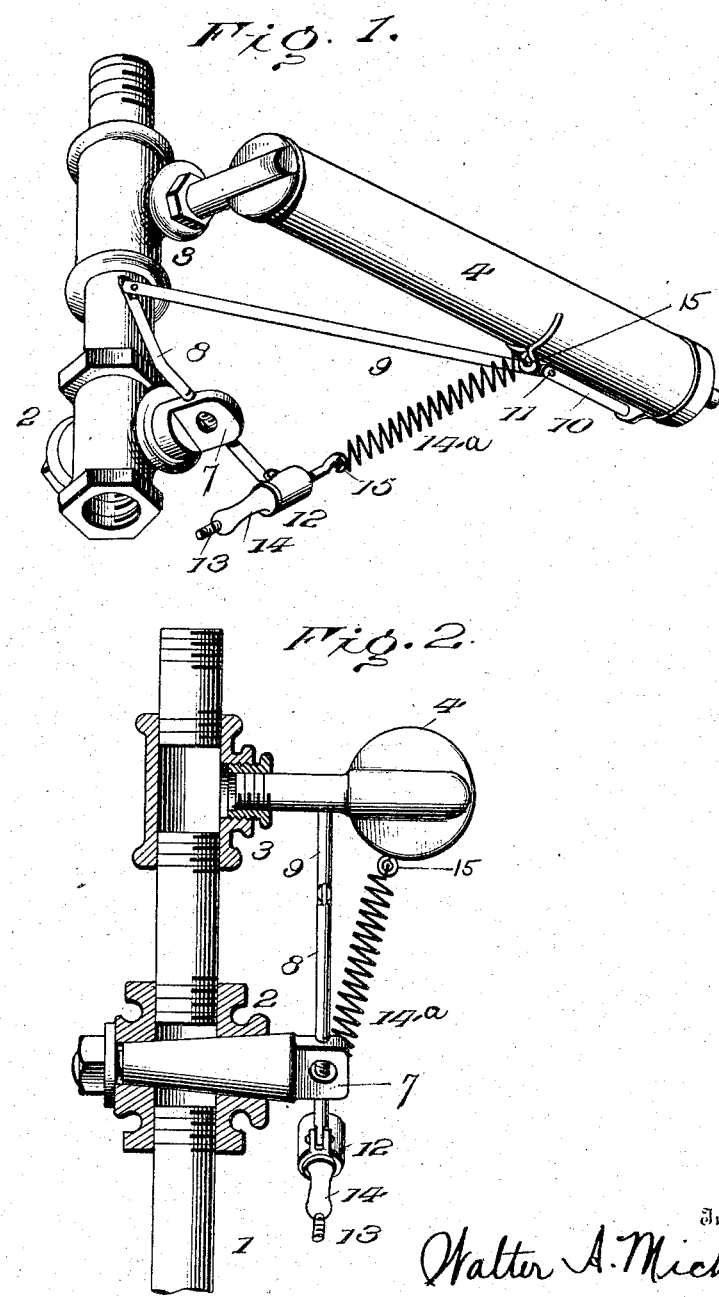

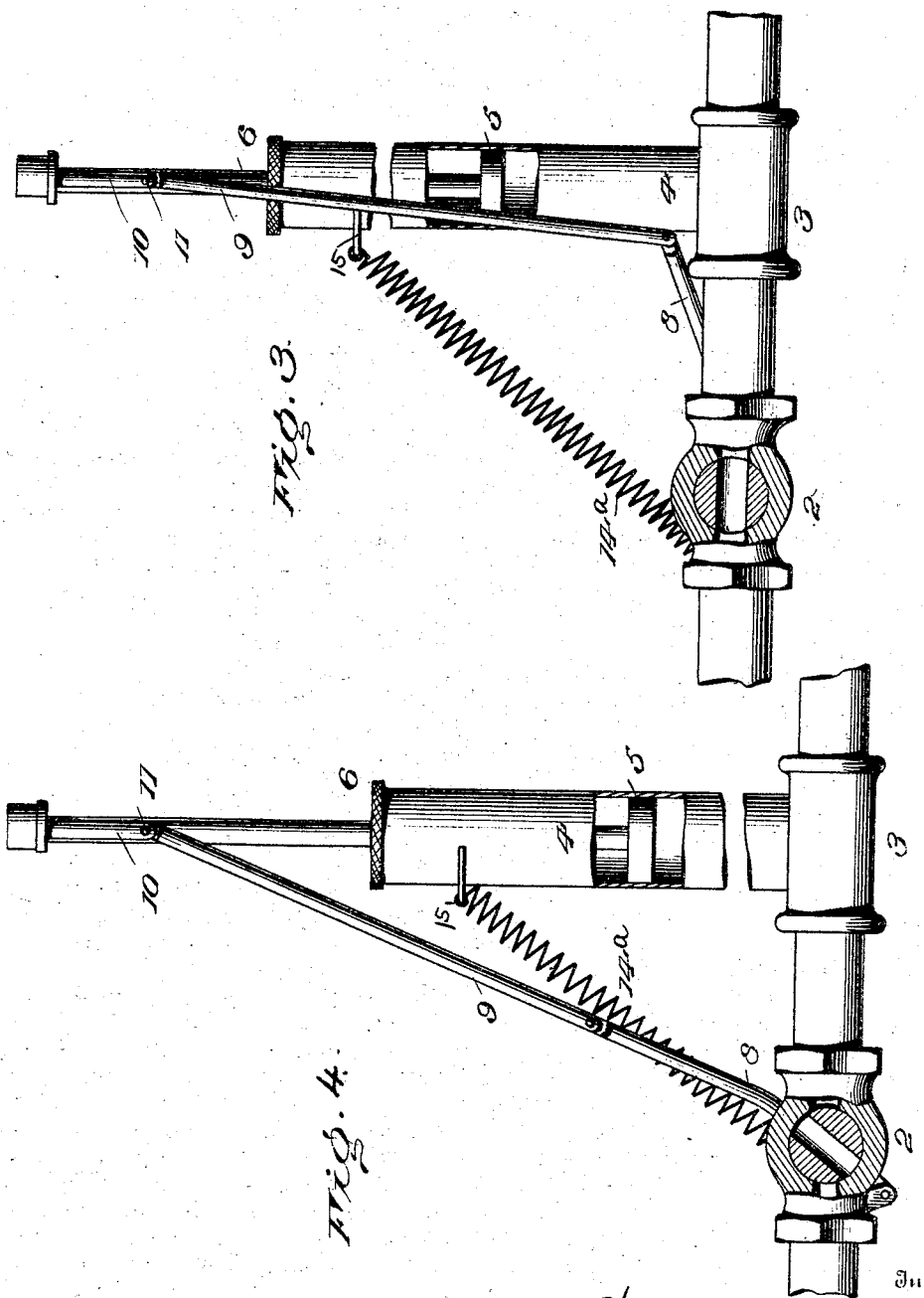

No. 782,457.

Patented February 14, 1905.

UNITED STATES PATENT OFFICE.

WALTER A. MICHAEL, OF BARNESVILLE, OHIO.

AUTOMATIC GAS CUT-OFF.

SPECIFICATION forming part of Letters Patent No. 782,457, dated February 14, 1905.

Application filed May 27, 1904. Serial No. 210,120.

*To all whom it may concern:*

Be it known that I, WALTER A. MICHAEL, a citizen of the United States of America, and a resident of Barnesville, in the county of Belmont and State of Ohio, have invented certain new and useful Improvements in Automatic Gas Cut-Offs, of which the following is a specification.

This invention relates to certain new and useful improvements in devices for automatically shutting off the supply of gas when the pressure of gas fails, so that there is no danger of the gas escaping when the pressure is again available. I accomplish this by the use of a piston and cylinder so arranged that when the gas is turned on the gas is permitted to flow in the cylinder and keep the piston at such a place as also to keep the supply-valve open, the arrangement being such that as soon as the gas-pressure fails for any reason whatever the pressure against the piston lowers and permits a spring to act so as to close the supply-cock, and thus prevent any escape when the supply is again in the pipes.

Another object is to provide a device which will automatically shut off the supply whenever the pressure becomes too great.

My invention therefore consists of a device of the character just outlined such as will now be hereinafter more particularly described in detail and then definitely claimed at the end hereof.

In the accompanying drawings, which form a part hereof, Figure 1 is a perspective view of my improvement. Fig. 2 is a section through the device with the supply-valve closed. Fig. 3 is a section at right angles to that shown in Fig. 2 with the supply-valve open. Fig. 4 is a similar view with the valve closed.

Referring now to the details of the drawings by numerals, 1 designates the supply-valve, and between it and the burner (not shown) are secured a cock or valve 2 and a coupling or T 3, which may be of any construction desired. A cylinder 4 is connected, preferably, to the coupling or T 3, and in this cylinder is located a piston 5 and piston-rod 6, all of which may be of any approved construction.

To the stem 7 of the cock 2 is connected an arm 8, which preferably extends outwardly on each side of said stem, as clearly indicated in the drawings. One end of this arm 8 is connected to the piston-rod 6, and in order to permit the proper freedom of movement of the various parts I prefer to form this connection of two rods 9 and 10, pivoted to each other at 11 and also to the rod 8 and the piston-rod 6. To the other end of the rod 8 is pivotally connected a clip 12, and through this clip passes a screw-threaded rod 13, on which is screwed an adjusting-nut 14. To the other end of the rod 13 is secured one end of a spring $14^a$, the other end of which spring is connected at 15 in any desirable manner with the aforesaid cylinder 4, or it may of course be connected to any other fixed part of the device.

The foregoing is a description of the preferable embodiment of my invention, and its operation is as follows: When it is desired to light the gas, the cock 2 may be turned by the user either by grasping the arm 8 and turning it or by drawing on the exposed end of the piston-rod 6. By doing either of these the user turns the cock to admit a supply of gas above the cock and simultaneously withdraws the piston 5, and thus permits the supply of gas to also enter the cylinder 4. The gas is of course then ignited, and it will be understood that the tension of the spring $14^a$ has been previously so adjusted by the nut 14 as to permit the pressure of gas to hold the piston 6 in its outward position against the tension of said spring. It will therefore be understood that as soon as the pressure of gas fails for any reason the spring draws the arm 8 upward from the position shown in Fig. 3 to the position shown in Fig. 2, and by this action the supply of gas is turned off, so that when the supply is again available it cannot escape so far as to become a source of danger. The relative arrangement of the parts is also such that in case of excessive pressure the piston 5 would be driven so far out in the cylinder as to move the arm 8 on the opposite side from that shown in Fig. 2, and this would also cut off the supply of gas, so that it will be seen that my cut-off works automatically to shut off the supply of gas either when the pressure fails or whenever it becomes too great.

It is manifest that changes and modifications may be made without departing from my invention as set forth by the following claims.

What I claim as my invention is—

1. In a device of the character described, a supply-pipe, a burner, a gas-cock, a cylinder and piston arranged in operative connection with said gas-cock and arranged to move said cock and cut off the supply of gas from both the burner and cylinder in the event of a stoppage or an overpressure of the gas, substantially as described.

2. In a device of the character described, a supply-pipe, a valve and burner connected therewith, a cylinder and piston coacting with said cock and controlling the movement of the same, said cylinder having communication with said supply-pipe, and connections between said piston and cock closing the latter and cutting off the supply from both the burner and cylinder when the supply fails or in case of overpressure, substantially as described.

3. In a device of the character described, a supply-pipe, a valve and burner connected therewith, a cylinder and piston connected with the supply-pipe between said cock and said burner, an arm on said cock, a pivotal connection between the piston-rod and said arm, and a spring also coacting with said arm against the action of the piston, substantially as described.

4. In a device of the character described, a supply-pipe, a valve and burner connected therewith, a cylinder and piston connected with the supply-pipe between said cock and said burner, an arm on said cock, a pivotal connection between the piston-rod and said arm, and a spring also coacting with the said arm against the action of the piston, and means for adjusting the spring, substantially as described.

Signed by me at Barnesville, Ohio, this 23d day of May, 1904.

WALTER A. MICHAEL.

Witnesses:
JOHN S. MICHAEL,
W. O. CHAFFEE.